(12) United States Patent
Thomaschewski et al.

(10) Patent No.: US 11,377,195 B2
(45) Date of Patent: Jul. 5, 2022

(54) ATTACHMENT HOUSING FOR FASTENING TO AN AIRCRAFT

(71) Applicant: Lufthansa Technik AG, Hamburg (DE)

(72) Inventors: Oliver Thomaschewski, Norderstedt (DE); Tobias Adugna, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/425,959

(22) PCT Filed: Jan. 27, 2020

(86) PCT No.: PCT/EP2020/051935
§ 371 (c)(1),
(2) Date: Jul. 27, 2021

(87) PCT Pub. No.: WO2020/157011
PCT Pub. Date: Aug. 6, 2020

(65) Prior Publication Data
US 2022/0144408 A1 May 12, 2022

(30) Foreign Application Priority Data
Jan. 29, 2019 (DE) ...................... 10 2019 201 103.9

(51) Int. Cl.
*H01Q 1/28* (2006.01)
*H01Q 1/42* (2006.01)
(Continued)

(52) U.S. Cl.
CPC ................ *B64C 1/36* (2013.01); *B64C 1/406* (2013.01); *H01Q 1/28* (2013.01);
(Continued)

(58) Field of Classification Search
CPC ............ H01Q 1/28; H01Q 1/281; H01Q 1/42; H01Q 1/1214; G01S 13/933
See application file for complete search history.

(56) References Cited

U.S. PATENT DOCUMENTS 8,063,837 B1 11/2011 Jennings et al.
9,781,849 B2 10/2017 Negishi et al.
(Continued)

FOREIGN PATENT DOCUMENTS

| DE | 102006053111 A1 | 5/2008 |
| DE | 112013004771 T5 | 6/2015 |
| WO | WO 2011007164 A2 | 1/2011 |

*Primary Examiner* — Hoang V Nguyen
(74) *Attorney, Agent, or Firm* — Leydig, Voit & Mayer Ltd.

(57) ABSTRACT

An attachment housing is for fastening to an exterior side of an aircraft. The attachment housing has a functional compartment. The functional compartment is divided in two, and has a ventilation compartment and a protective compartment. A surrounding wall is configured to separate the ventilation compartment from an environment. The surrounding wall has at least one ventilation opening for air exchange between the ventilation compartment and the environment. A dividing wall is arranged between the ventilation compartment and the protective compartment. The dividing wall has at least one passage opening for air exchange between the ventilation compartment and the protective compartment. The passage opening is configured to counter act a penetration of water, moisture, or particles into the protective compartment.

14 Claims, 1 Drawing Sheet

(51) Int. Cl.
  *B64C 1/36*   (2006.01)
  *B64C 1/40*   (2006.01)
  B64C 1/00    (2006.01)
  G01S 7/02    (2006.01)
  G01S 13/933  (2020.01)

(52) U.S. Cl.
  CPC ......... *B64C 2001/009* (2013.01); *G01S 7/027* (2021.05); *G01S 13/933* (2020.01); *H01Q 1/281* (2013.01); *H01Q 1/42* (2013.01)

(56) References Cited

U.S. PATENT DOCUMENTS

| | | |
|---|---|---|
| 2009/0321572 A1 | 12/2009 | Ferguson et al. |
| 2011/0221626 A1* | 9/2011 | Hill ........................ G01S 13/933 244/129.1 |
| 2012/0326915 A1* | 12/2012 | Hill .......................... H01Q 1/28 156/216 |
| 2015/0306529 A1 | 10/2015 | Yano |
| 2016/0172748 A1 | 6/2016 | Keen et al. |
| 2018/0331424 A1 | 11/2018 | Sclafani |

\* cited by examiner

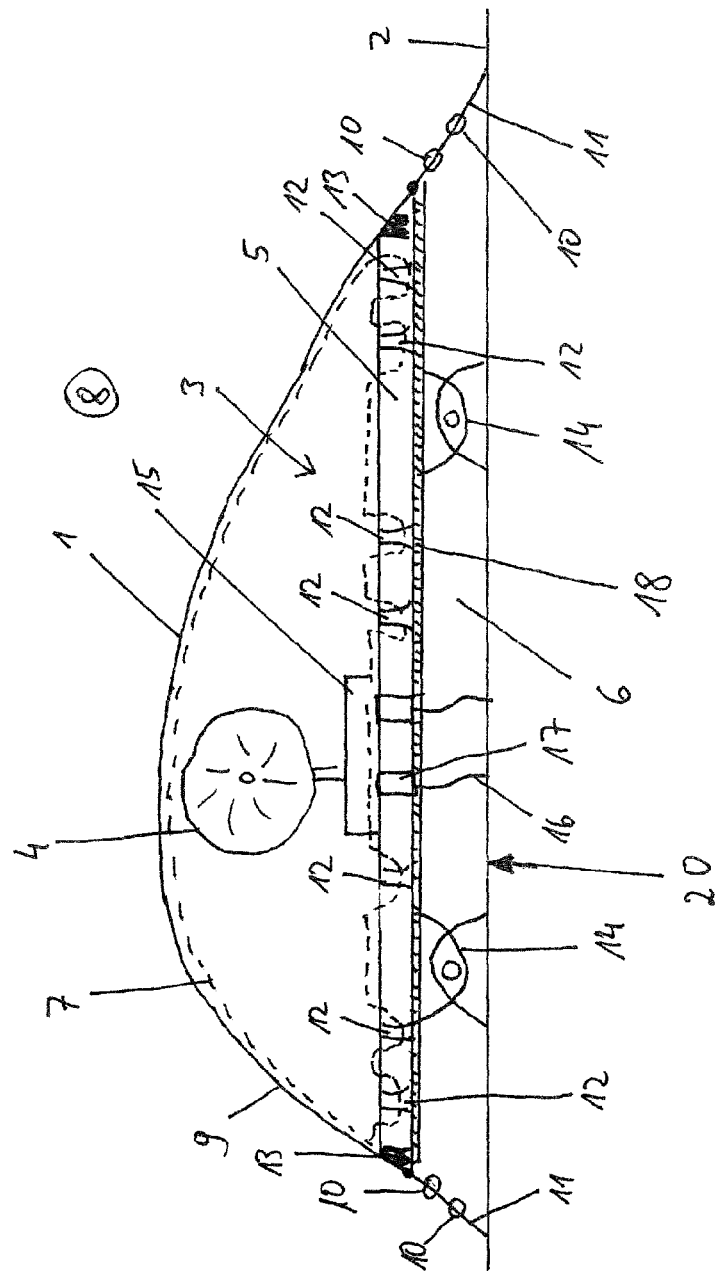

ATTACHMENT HOUSING FOR FASTENING TO AN AIRCRAFT

CROSS REFERENCE TO RELATED APPLICATIONS

This application is a U.S. National Phase application under 35 U.S.C. § 371 of International Application No. PCT/EP2020/051935, filed on Jan. 27, 2020, and claims benefit to German Patent Application No. DE 10 2019 201 103.9, filed on Jan. 29, 2019. The International Application was published in German on Aug. 6, 2020 as WO 2020/157011 A1 under PCT Article 21(2).

FIELD

The present invention relates to an attachment housing for fastening to an exterior side of an aircraft, wherein the attachment housing encloses a functional compartment, and to an aircraft with such an attachment housing.

BACKGROUND

Modern aircraft are generally equipped with sensitive electronic components, which can provide sensor and transmission functions, such as radar or radio antenna systems. These components are usually not located in the pressurized cabin area, but at the exterior of the aircraft. To prevent these sensitive components from being directly exposed to the environment, and thus to wind, rain, snow, ice, deicing agents, dirt and suspended particles, they are protected by unpressurized housings. These unpressurized housings can be designed as an integral part of the aircraft fuselage or as aerodynamically shaped dome-like housings attached to the aircraft fuselage or booms. Radar sensors are often housed in so-called radomes in particular at the nose of the fuselage.

Not only on-board communications equipment and flight-related technical equipment, but also scientific or safety-related sensors can be attached to the aircraft in protective housings, for example thermal sensors or cameras for earth observation.

Radomes are usually not pressurized housings and are only designed for small pressure differences to the environment or atmosphere. To avoid damage to the components and also to the internal structures of the protective housings, large air pressure gradients between the interior of the protective housings and the environment must be avoided. The ventilation of the housings is usually formed by simple passage openings.

Therefore, it is necessary that air is continuously released to the environment during the climb flight in order not to build up a relevant overpressure. Likewise, during descent, air must flow from the atmosphere into the protective housing.

To protect against damaged components or even structural failure of the housing due to critical overpressure, which can occur, for example, in the event of leakage between the fuselage and the housing, sufficient areas are also provided in the housing wall to allow abrupt venting. Such abrupt venting may be required, for example, in the event of a pressure loss in the cabin, provided that the leakage from the cabin is covered by the attachment housing.

In this case, it is hardly avoidable that liquid, moisture, and dirt can enter the housing and aggregate there through the passage openings provided, which allow a large exchange of air. The electronic components suffer from contamination and moisture, which leads to reduced performance and even failure. In addition, an increased tendency to corrosion is seen in practice, which can cause massive damage to the internal structures and components. This leads to narrow maintenance intervals and increased repair costs for such unpressurized housings.

SUMMARY

In an embodiment, the present disclosure provides an attachment housing that is for fastening to an exterior side of an aircraft. The attachment housing has a functional compartment. The functional compartment is divided in two, and has a ventilation compartment and a protective compartment. A surrounding wall is configured to separate the ventilation compartment from an environment. The surrounding wall has at least one ventilation opening for air exchange between the ventilation compartment and the environment. A dividing wall is arranged between the ventilation compartment and the protective compartment. The dividing wall has at least one passage opening for air exchange between the ventilation compartment and the protective compartment. The passage opening is configured to counter act a penetration of water, moisture, or particles into the protective compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 illustrates a schematic section through an attachment housing according to the invention.

DETAILED DESCRIPTION

Embodiments of the present invention provide an attachment housing for fastening to an aircraft, which provides improved protection for electrical components housed therein and reduced maintenance and repair expenses.

According to an aspect of the invention, an attachment housing for fastening to the exterior side of an aircraft is provided, wherein the attachment housing forms a functional compartment on the exterior side of the aircraft. The functional compartment is divided into two parts and comprises a ventilation compartment for air exchange with the environment and a protective compartment. A dividing wall is provided between the ventilation compartment and the protective compartment, in which at least one passage opening is provided for air exchange between the ventilation compartment and the protective compartment. The passage opening is arranged to counteract the ingress of water, moisture and/or particles, in particular from the ventilation compartment into the protective compartment.

By dividing the functional compartment into two separate sections, the protective function for electrical components and the air pressure compensation function, in particular for abrupt venting, are decoupled from each other. The sensitive electronics are optimally protected in the protective compartment, for example against splash water caused by rain or de-icing.

The functional compartment interacts with the environment only via the ventilation compartment. Air is exchanged, which introduces moisture and dirt into the ventilation compartment and can aggregate there, but this is harmless at this point. The ventilation into the atmosphere can therefore be designed relatively freely to allow optimum air exchange and good abrupt venting in the event of a sudden loss of pressure.

A ventilation and venting of the protective compartment is advantageously carried out exclusively via the dividing wall between the protective compartment and the ventilation compartment through the at least one passage opening. In other respects, the protective compartment is completely airtight with respect to the atmosphere.

The protective compartment is thus advantageously delimited from the ventilation compartment by the especially plate-shaped dividing wall and from the environment by a rigid airtight housing.

Such an attachment housing can be positioned independently of the fuselage position on the exterior of the aircraft. For example, it can be attached to the top or bottom of the fuselage. Preferably, the housing has an advantageous aerodynamic shape and is adapted in size to the space requirements of the electronics to be installed.

Preferably, in a state in which the attachment housing is mounted on the aircraft, the ventilation compartment faces the exterior side of the aircraft and the protective compartment faces away from the exterior side of the aircraft. The ventilation compartment is thus advantageously arranged between the exterior side of the aircraft and the protective compartment. Due to the arrangement of the ventilation compartment between the exterior side of the aircraft and the protective compartment, the protective compartment is advantageously arranged at a positive distance from the exterior side of the aircraft. This arrangement of protective compartment and ventilation compartment allows a suitable utilization of the available installation space and at the same time an efficient ventilation of the ventilation compartment.

In a particularly advantageous embodiment, the or each passage opening in the dividing wall is associated with a semi-permeable membrane, which, on the one hand, allows air exchange between the ventilation compartment and protective compartment, but, on the other hand, counteracts the ingress of liquid, in particular water in liquid form, such as water droplets of any size, and/or particles from the ventilation compartment into the protective compartment. A semi-permeable membrane ensures the functionality of the dividing wall according to an embodiment of the invention in a simple and reliable manner. The semi-permeable membrane advantageously seals all passage openings of the dividing wall. The membrane only allows air exchange, but not moisture and particle transport. Such breathable and water-impermeable membranes or textiles are commercially available and are used industrially. This easily forms a very effective barrier for the passage openings in the adapter plate, so that a very dry and clean protective compartment with controlled ventilation for the electrical components and a well ventilated ventilation compartment are formed. The membrane can be combined with the geometric arrangements discussed below, but the operation of the semi-permeable membrane is so effective that the membrane can be combined with simple passage openings, which simplifies and reduces the cost of manufacture and maintenance.

The passage opening can be formed by a simple, for example circular channel; the semi-permeable functionality according to an embodiment of the invention can then be achieved, for example, by an appropriate cross-sectional dimensioning of the channels.

In a preferred further development, the passage opening can also comprise a different geometry, for example a channel without a continuous axis, for example with a bent, or more generally labyrinth-like, course. This enables a simple labyrinth separator for any dirt particles that may be present.

Preferably, the passage opening in the dividing wall forms a labyrinth opening so that dirt and liquid are prevented from entering the protective compartment by geometric barriers (labyrinth seal). The labyrinth opening can also be used as a condensation device for air humidity, wherein advantageously a drain is provided for the condensed water. In contrast to the ventilation device between the ventilation compartment and the atmosphere, which must be able to withstand sudden drops in pressure and must therefore be designed with particularly favorable aerodynamic properties and low resistance, the ventilation of the protective compartment for the separation of moisture, liquid and dirt particles can be distinctly labyrinth-like and form a correspondingly large number of geometric barriers.

In other preferred embodiments, at least one separating device for separating moisture, liquid and/or particles is provided in the passage opening. Further preferably, the passage opening is provided with a particle filter. This can be formed, for example, by fiber mat or metal mesh. This provides even better protection for the protective compartment and the functional components against the ingress of dirt particles and suspended matter.

Preferably, the dividing wall on the side facing the protective compartment includes an area in which electronic components can be fastened. The mechanical connection of the functional components is provided in this area, for example via screw, clamp or other fasteners.

Preferably, electrical connections for electrical functional components installed in the protective compartment are routed through the dividing wall by means of a sealed connection. This ensures that air is exchanged only through the passage openings provided for this purpose and that moisture and liquids cannot enter the protective compartment and the electronics through simple cable ducts.

Preferably, the dividing wall includes fasteners on the side facing the ventilation compartment for fastening the attachment housing to the exterior of an aircraft. The fasteners on the dividing wall thereby cooperate with corresponding fasteners on the exterior side of the fuselage. The outer shell of the attachment housing is thus advantageously free of fasteners with the fuselage, such as hinges or bolted connections, and also does not experience corresponding mechanical stresses. The outer shell is also supported by the dividing wall and forms an airtight seal with it.

In the region of the ventilation compartment, the outer shell forms a surrounding wall, in particular in the form of a skirt, which separates it from the environment and preferably abuts the exterior side of the aircraft in a state in which it is mounted on the aircraft. At least one ventilation opening is provided in the surrounding wall for the exchange of air between the ventilation compartment and the atmosphere.

Further, an aircraft comprises, according to an embodiment of the invention, such an attachment housing which is fastened or fastenable to the exterior side of the aircraft.

In the embodiment shown in FIG. 1, an attachment housing 1 according to the invention is attached to the exterior side 2 of an aircraft. The attachment housing 1 abuts the exterior side 2 of the aircraft and forms a functional compartment 3 in the interior. This functional compartment 3 is intended to accommodate electrical functional components 4. These can be, for example, radar systems, radio systems or scientific or monitoring sensors such as cameras for earth observation. A radio antenna system is shown schematically in FIG. 1. Such electronic functional components are usually susceptible to contamination and moisture, which can lead to reduced performance or even failure.

The outer housing typically has a favorable aerodynamic shape in order to keep the resulting air resistance as low as possible and not to restrict the flight stability of an aircraft. The functional compartment 3 is divided into two separate sections by an advantageously plate-shaped dividing wall 5. A ventilation compartment 6 is formed on the side of the dividing wall 5 facing the exterior side 2 of the aircraft, and a protective compartment 7 is formed on the side of the dividing wall 5 facing away from the exterior side 2 of the aircraft.

The ventilation compartment 6 extends over the entire area below the dividing wall 5 and the protective compartment 7, wherein the protective compartment 7 can generally comprise a significantly larger volume than the ventilation compartment 6. The protective compartment 7 is separated from the ventilation compartment 6 by the dividing wall 5 and from the atmosphere by the housing enclosure 9. The housing enclosure 9 is formed by an air-impermeable, advantageously rigid material, for example coated metal or fiber composite material.

In a preferred embodiment, to avoid damage to the electronics 4, large air pressure gradients between the interior of the functional compartment 3 and the ambient atmosphere 8 should be avoided. Therefore, air should be continuously released to the environment 8 during the climb of the aircraft. Accordingly, air should be able to flow from the ambient atmosphere 8 into the functional compartment 3 during descent.

Ventilation of the functional compartment 3 with respect to the environment 8 is thereby ensured by ventilation openings 10 which, in a skirt-like region 11 of the housing 1, permit an exchange of air between the ambient atmosphere 8 and the ventilation compartment 6. In order to ensure the best possible air exchange and to withstand sudden abrupt venting, which can be caused by leakage of the pressurized cabin in the area of the attachment housing, the ventilation openings 10 are designed to be particularly favorable in terms of aerodynamics and to have low resistance.

For example, geometric barriers can be used to prevent the ingress of splash water, for example rain, or dirt particles through the ventilation openings 10 to a large extent. Nevertheless, it can hardly be avoided at this point that moisture and dirt can ingress into the ventilation compartment 6 and aggregate there. In order to enable abrupt venting, a rubber lip 19 can advantageously be provided in a region where the skirt 11 abuts the exterior side 2 of the aircraft, which lip opens in the event of a high pressure gradient between the ventilation compartment 6 and the ambient atmosphere 8 and enables an increased exchange of air.

In the embodiment shown, the dividing wall 5 is advantageously formed by an adapter plate which serves as a mechanical support for the entire attachment housing 1. At the edges of the adapter plate 5, the rigid housing 9 is connected to the adapter plate 5, preferably in an airtight manner, thereby forming the enclosed protective compartment 7. On the side of the adapter plate 5 facing the exterior side 2 of the aircraft, fastening devices 13 are provided with which the entire attachment housing 1 can be fastened to corresponding fastening devices 14, for example via screw, snap and/or clamp fasteners.

On the side of the adapter plate 5 facing the protective compartment 7, an area 15 is provided in which the functional electronics 4 can be fastened. Fasteners adapted to the requirements can again be provided for fastening the functional components 4, for example screw, snap and/or clamp. For the electronic connection of the functional components 4, electrical connections, for example in the form of cables 16, run from the exterior side 2 to the adapter plate 5 and are guided through the dividing wall 5 by means of advantageously sealed cable bushings or sealed connections 17.

It must should be possible for air to be exchanged out of and into the protective compartment 7. This is ensured by ventilation holes 12 formed in the dividing wall 5 between the ventilation compartment 6 and the protective compartment 7. In the embodiment example shown, the ventilation holes 12 are realized by simple drill holes.

In order to provide effective protection against the penetration of moisture, liquid and/or dirt particles into the sensitive section of the protective compartment 7, a semi-permeable membrane 18 is provided on the side of the adapter plate 5 facing the ventilation compartment 6, which closes all ventilation holes 12. This membrane 18 is air-permeable but at the same time water-repellent and provides optimum protection against penetration of liquid water, in particular water droplets of all sizes, and dirt particles in the direction of the protective compartment 7. The membrane 18 need only be interrupted at the positions of the cable bushings 16. Since sealed connections 17 are used, however, moisture cannot penetrate into the protective compartment at this point either.

Due to the semi-permeable membrane 18 as an optimum separating device for liquid and/or particles, on the one hand a clean volume (dashed line) is formed in the protective compartment 7 and sensitive functional electronics 4 and components at risk of corrosion can be installed without further protective measures. On the other hand, the ventilation compartment 6 represents a very well ventilated volume in which moisture and dirt particles can collect without damaging the electronics and which provides a high air exchange with the ambient atmosphere 8.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An attachment housing for fastening to an exterior side of an aircraft, the attachment housing comprising:
 a functional compartment enclosed by the attachment housing, the functional compartment being divided in two and comprising a ventilation compartment and a protective compartment, the ventilation compartment being separated from an environment by a surrounding wall comprising at least one ventilation opening for air exchange between the ventilation compartment and the environment; and
 a dividing wall arranged between the ventilation compartment and the protective compartment, the dividing wall comprising at least one passage opening for air exchange between the ventilation compartment and the protective compartment,
 wherein the passage opening is arranged in such a way that the passage opening counteracts a penetration of water, moisture, and/or particles into the protective compartment.

2. The attachment housing according to claim 1, wherein, in a state mounted on the aircraft, the ventilation compartment faces the exterior side of the aircraft and the protective compartment faces away from the exterior side of the aircraft.

3. The attachment housing according to claim 2, wherein the protective compartment is arranged at a positive distance from the exterior side of the aircraft.

4. The attachment housing according to claim 1, wherein a semi-permeable membrane is assigned to the passage opening.

5. The attachment housing according to claim 1, wherein the passage opening forms a labyrinth opening or labyrinth seal.

6. The attachment housing according to claim 1, wherein at least one separating device configured to separate moisture, liquid, and/or particles is disposed in the passage opening.

7. The attachment housing according to claim 1, wherein a particle filter is assigned to the passage opening.

8. The attachment housing according to claim 1, wherein the dividing wall comprises, on a side facing the protective compartment, an area in which electronic components can be fastened.

9. The attachment housing according to claim 1, wherein electrical connections for electrical components installed in the protective compartment are routed through the dividing wall using a sealed connection.

10. The attachment housing according to claim 1, wherein the dividing wall comprises, on a side facing the ventilation compartment, at least one fastening device for fastening the attachment housing to an exterior side of an aircraft.

11. The attachment housing according to claim 1, wherein the surrounding wall is in the form of a skirt.

12. The attachment housing according to claim 1, wherein the surrounding wall is adapted to abut the exterior side of the aircraft in a state mounted on the aircraft.

13. The attachment housing according to claim 1, wherein the protective compartment is delimited from the ventilation compartment by the dividing wall and from the surroundings by an air-impermeable housing part.

14. An aircraft having the attachment housing attached to an exterior side according to claim 1.

* * * * *